United States Patent
Hwang et al.

(10) Patent No.: US 9,831,958 B2
(45) Date of Patent: Nov. 28, 2017

(54) RESOURCE ALLOCATION FOR SUPERPOSITION CODING

(71) Applicant: MEDIATEK INC., Hsinchu (TW)

(72) Inventors: Chien-Hwa Hwang, Hsinchu County (TW); Tze-Ping Low, Lexington, MA (US); Lung-Sheng Tsai, Tainan (TW); Yi-Ju Liao, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 110 days.

(21) Appl. No.: 14/981,154

(22) Filed: Dec. 28, 2015

(65) Prior Publication Data
US 2016/0191175 A1 Jun. 30, 2016

Related U.S. Application Data

(60) Provisional application No. 62/097,797, filed on Dec. 30, 2014.

(51) Int. Cl.
*H04W 4/00* (2009.01)
*H04B 15/00* (2006.01)
(Continued)

(52) U.S. Cl.
CPC .......... *H04B 15/00* (2013.01); *H04L 1/1822* (2013.01); *H04L 5/00* (2013.01); *H04L 1/1812* (2013.01); *H04W 72/044* (2013.01)

(58) Field of Classification Search
None
See application file for complete search history.

(56) References Cited

U.S. PATENT DOCUMENTS

| 8,286,047 B2 | 10/2012 | Che et al. ............. 714/751 |
| 8,665,720 B2 | 3/2014 | Shen et al. ............. 370/235 |

(Continued)

FOREIGN PATENT DOCUMENTS

| CN | 101094048 A | 12/2007 |
| CN | 101965707 A | 2/2011 |

(Continued)

OTHER PUBLICATIONS

International Search Report and Written Opinion of International Search Authority for PCT/CN2015/099663 dated Mar. 23, 2016 (11 pages).

(Continued)

*Primary Examiner* — Anh-Vu Ly
(74) *Attorney, Agent, or Firm* — Imperium Patent Works; Zheng Jin

(57) ABSTRACT

When the codeword level interference cancellation (CW-IC) is used at the receiver in conjunction with the superposition coding scheme at the transmitter, in order to guarantee the success of signal reception, restrictions of scheduling decisions in resource allocation of superposed transport blocks may occur. A method to mitigate the scheduling restrictions is proposed. For a low-geometry UE in NOMA operation, one sub-band is used as the basic scheduling unit. As a result, data in resource blocks scheduled for NOMA operation and data in resource blocks scheduled for other non-NOMA operation correspond to different transport blocks. Therefore, a high-geometric UE only needs to decode the data scheduled for NOMA. The base station does not need to impose additional scheduling restrictions and signaling overhead.

20 Claims, 6 Drawing Sheets

(51) Int. Cl.
*H04L 5/00* (2006.01)
*H04L 1/18* (2006.01)
*H04W 72/04* (2009.01)

(56) References Cited

U.S. PATENT DOCUMENTS

| | | | |
|---|---|---|---|
| 8,724,742 B2 | 5/2014 | Nimbalker et al. | 375/316 |
| 8,908,632 B2* | 12/2014 | Pi | H03M 13/27 370/329 |
| 9,444,591 B2* | 9/2016 | Pi | 370/328 |
| 9,680,578 B2 | 6/2017 | Hwang et al. | |
| 2005/0233754 A1 | 10/2005 | Beale | 455/452.2 |
| 2008/0005638 A1 | 1/2008 | Kuo et al. | 714/748 |
| 2009/0318183 A1 | 12/2009 | Hugl et al. | 455/522 |
| 2010/0050034 A1 | 2/2010 | Che et al. | 714/748 |
| 2012/0057529 A1 | 3/2012 | Seo et al. | 370/329 |
| 2012/0087396 A1 | 4/2012 | Nimbalker et al. | 375/219 |
| 2012/0269137 A1 | 10/2012 | Kang et al. | 370/329 |
| 2012/0275397 A1 | 11/2012 | Hsieh et al. | 370/329 |
| 2013/0051289 A1 | 2/2013 | Hsieh et al. | 370/280 |
| 2013/0121216 A1 | 5/2013 | Chen et al. | 370/280 |
| 2013/0165183 A1 | 6/2013 | Gerstenberger et al. | 455/561 |
| 2013/0252624 A1 | 9/2013 | Pajukoski et al. | 455/452.1 |
| 2014/0044091 A1 | 2/2014 | Kishiyama | 370/330 |
| 2014/0044206 A1 | 2/2014 | Nammi et al. | 375/267 |
| 2014/0050279 A1 | 2/2014 | Kishiyama | 375/285 |
| 2014/0071894 A1 | 3/2014 | Kairouz et al. | 370/328 |
| 2014/0086372 A1 | 3/2014 | Kishiyama et al. | 375/346 |
| 2014/0245095 A1 | 8/2014 | Nammi et al. | 714/749 |
| 2014/0307569 A1 | 10/2014 | Barbieri et al. | 370/252 |
| 2014/0321418 A1 | 10/2014 | Rinne et al. | 370/329 |
| 2015/0029926 A1 | 1/2015 | Ryu et al. | 370/312 |
| 2015/0171983 A1 | 6/2015 | Kusashima | 370/329 |
| 2015/0312074 A1 | 10/2015 | Zhu et al. | 370/329 |
| 2016/0050049 A1 | 2/2016 | Yang et al. | 370/329 |
| 2016/0080133 A1 | 3/2016 | Golitschek Edler von Elbwart et al. | 370/280 |
| 2016/0112995 A1 | 4/2016 | Chen | 370/329 |
| 2016/0173262 A1 | 6/2016 | Davydov et al. | 370/329 |
| 2016/0174230 A1 | 6/2016 | Benjebbour et al. | 370/329 |
| 2016/0191174 A1* | 6/2016 | Hwang | H04B 15/00 375/348 |
| 2016/0192383 A1* | 6/2016 | Hwang | H04L 1/1812 370/330 |
| 2016/0337018 A1* | 11/2016 | Hwang | H04L 5/003 370/328 |
| 2016/0337879 A1* | 11/2016 | Hwang | H04B 17/336 370/328 |
| 2017/0041906 A1* | 2/2017 | Tsai | H04W 72/042 370/328 |
| 2017/0118665 A1 | 4/2017 | Park et al. | 370/329 |
| 2017/0134109 A1* | 5/2017 | Hwang | H04B 7/0452 370/328 |
| 2017/0134150 A1* | 5/2017 | Hwang | H04L 5/14 370/328 |
| 2017/0135114 A1* | 5/2017 | Hwang | H04B 7/0452 370/328 |

FOREIGN PATENT DOCUMENTS

| | | |
|---|---|---|
| CN | 102761510 A | 10/2012 |
| CN | 103051435 A | 4/2013 |
| CN | 103155470 A | 6/2013 |
| CN | 103493380 A | 1/2014 |
| CN | 103609052 A | 2/2014 |
| CN | 104040930 A | 9/2014 |
| JP | 2015012458 A | 1/2015 |
| WO | WO2012161081 A1 | 11/2012 |
| WO | WO2013070837 A1 | 5/2013 |
| WO | WO2013176042 A1 | 11/2013 |
| WO | WO2014208140 A1 | 12/2014 |

OTHER PUBLICATIONS

International Search Report and Written Opinion of International Search Authority for PCT/CN2015/099664 dated Mar. 24, 2016 (12 pages).
International Search Report and Written Opinion of International Search Authority for PCT/CN2015/099665 dated Mar. 24, 2016 (11 pages).
International Search Report and Written Opinion of International Search Authority for PCT/CN2015/099666 dated Mar. 22, 2016 (11 pages).
3GPP TS 36.213, "Evolved Universal Terrestrial Radio Access (E-UTRA); Physical layer procedures". Section 7.1.6.
U.S. Office Action for related US. Appl. No. 14/980,991 dated Aug. 19, 2016 (15 pages).
Choi "H-ARQ based on Non-Orthogonal Multiple Access with Successive Interference cancellation", 2008, IEEE, pp. 1-5.
USPTO, Office Action for related U.S. Appl. No. 14/980,750 dated Jun. 13, 2017 (9 pages).
USPTO, Office Action for related U.S. Appl. No. 14/980,867 dated Sep. 12, 2017 (12 pages).
EPO, Search Report for the EP patent application 15875245.1 dated Aug. 29, 2017 (10 pages).
3GPP TSG RAN Meeting #66 RP-141895, MediaTek Inc., Motivation for Enhanced Multiuser Transmissions and Network Assisted Interference Cancellation for LTE, Maui, USA dated Dec. 8-11, 2014, *p. 3-p. 4*.
EPO, Search Report for the EP patent application 15875246.9 dated Aug. 29, 2017 (10 pages).
3GPP TSG-RAN WG1 Meeting #76 R1-140402, ITRI, Maximum number of DL HARQ processes for TDD eIMTA, Prague, Czech Republic dated Feb. 10-14, 2014 (4 pages).
EPO, Search Report for the EP patent application 15875248.5 dated Aug. 31, 2017 (9 pages).

* cited by examiner

RESOURCE ALLOCATION FOR SUPERPOSITION CODING

CROSS REFERENCE TO RELATED APPLICATIONS

This application claims priority under 35 U.S.C. §119 from U.S. Provisional Application No. 62/097,797, entitled "Resource Allocation for Superposition Coding," filed on Dec. 30, 2014, the subject matter of which is incorporated herein by reference.

TECHNICAL FIELD

The disclosed embodiments relate generally to mobile communication networks, and, more particularly, to resource allocation for superposition coding.

BACKGROUND

In a wireless cellular communications system, multiuser multiple-input multiple-output (MU-MIMO) is a promising technique to significantly increase the cell capacity. In MU-MIMO, the signals intended to different users are simultaneously transmitted with orthogonal (or quasi-orthogonal) precoders. On top of that, the concept of a joint optimization of multiuser operation from both transmitter and receiver's perspective has the potential to further improve multiuser system capacity even if the transmission/precoding is non-orthogonal which could come from, for example but not limited to, the simultaneous transmission of a large number of non-orthogonal beams/layers with the possibility of more than one layer of data transmission in a beam. Such non-orthogonal transmission could allow multiple users to share the same resource elements without spatial separation, and allow improving the multiuser system capacity for networks with a small number of transmit antennas (i.e. 2 or 4, or even 1), where MU-MIMO based on spatial multiplexing is typically limited by wide beamwidth. An example of such joint Tx/Rx optimization associated with adaptive Tx power allocation and codeword level interference cancellation (CW-IC) receiver is recently a remarkable technical trend, including non-orthogonal multiple access (NOMA) and other schemes based on superposition coding.

When CW-IC is used, in order to guarantee the success of signal reception in NOMA, restrictions of scheduling decisions in resource allocation of superposed transport blocks (TB) may occur. A solution to mitigate the scheduling restrictions is sought.

SUMMARY

When the codeword level interference cancellation (CW-IC) is used at the receiver in conjunction with the superposition coding scheme at the transmitter, in order to guarantee the success of signal reception, restrictions of scheduling decisions in resource allocation of superposed transport blocks may occur. A method to mitigate the scheduling restrictions is proposed. For a low-geometry UE in NOMA operation, one sub-band is used as the basic scheduling unit. As a result, data in resource blocks scheduled for NOMA operation and data in resource blocks scheduled for other non-NOMA operation correspond to different TBs. Therefore, a high-geometric UE only needs to decode the data scheduled for NOMA. The base station does not need to impose additional scheduling restrictions and signaling overhead.

In one embodiment, a base station allocates a first time-frequency radio resource in a time slot to a first UE. The base station allocates a second time-frequency radio resource in the same time slot to a second UE. The first and the second time-frequency radio resources have non-overlapping radio resources. The base station schedules a first TB1 and a second TB2 over the first time-frequency radio resource to be transmitted to the first and the second UE respectively. The base station schedules a third TB over the second time-frequency radio resource to be transmitted to the second UE.

In another embodiment, a UE receives a first plurality of encoded information bits associated with a first transport block TB1. TB1 is transmitted over a first time-frequency radio resource in a time slot intended to the UE. TB1 is superposed with another TB intended to another UE. The UE receives a second plurality of encoded information bits associated with a second transport block TB2. TB2 is transmitted over a second time-frequency radio resource in the same time slot and having non-overlapping radio resources with the first time-frequency radio resource. The UE performs a single HARQ process for both TB1 and TB2.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
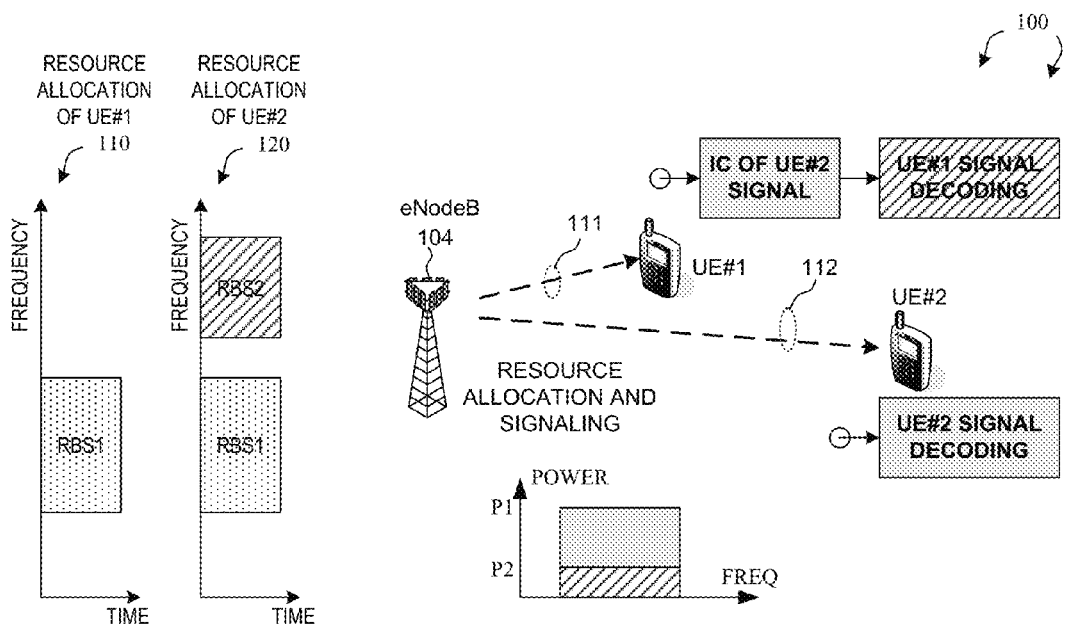
FIG. 1 illustrates a mobile communication network with soft packet combining for superposition coding and interference cancellation in accordance with one novel aspect.

FIG. 1 illustrates a mobile communication network 100 with superposition coding in accordance with one novel aspect. Mobile communication network 100 is an OFDM network comprising a plurality of user equipments UE#1, UE#2, and a serving base station eNodeB. In 3GPP LTE system based on OFDMA downlink, the radio resource is partitioned into subframes in time domain, each subframe is comprised of two slots and each slot has seven OFDMA symbols in the case of normal Cyclic Prefix (CP), or six OFDMA symbols in the case of extended CP. Each OFDMA symbol further consists of a number of OFDMA subcarriers in frequency domain depending on the system bandwidth. The basic unit of the resource grid is called Resource Element (RE), which spans an OFDMA subcarrier over one OFDMA symbol. Resource elements are grouped into resource blocks, where each resource block (RB) consists of 12 consecutive subcarriers in one slot.

Several physical downlink channels and reference signals are defined to use a set of resource elements carrying information originating from higher layers. For downlink channels, the Physical Downlink Shared Channel (PDSCH) is the main data-bearing downlink channel in LTE, while the Physical Downlink Control Channel (PDCCH) is used to carry downlink control information (DCI) in LTE. The control information may include scheduling decision, information related to reference signal information, rules forming the corresponding transport block (TB) to be carried by PDSCH, and power control command. For reference signals, Cell-specific reference signals (CRS) are utilized by UEs for the demodulation of control/data channels in non-precoded or codebook-based precoded transmission modes, radio link monitoring and measurements of channel state information (CSI) feedback. UE-specific reference signals (DM-RS) are utilized by UEs for the demodulation of control/data channels in non-codebook-based precoded transmission modes.

In the example of FIG. 1, UE#1 is served by its serving base station eNodeB 104. UE#1 receives desired radio signal 111 transmitted from eNB 104. However, UE#1 also receives interfering radio signals. In one example, UE#1 receives interfering radio signal 112 transmitted from the same serving eNB 104 due to non-orthogonal multiple access (NOMA) operation intended for multiple UEs (e.g., UE#2) in the same serving cell. UE#1 may be equipped with an interference cancellation (IC) receiver that is capable of cancelling the contribution of the interfering signals from the desired signals.

Assume superposition-coding scheme is used at the transmitter for the NOMA operation. Given the scenario of NOMA where UE#1 and UE#2 are scheduled in the same time-frequency resource and the transport blocks (TBs) intended to UEs #1 and #2 are superposed and multi-casted to the two users with different transmission power levels (P1>P2). Suppose that UE#1 is closer to the base station (eNB 104) than UE#2 and the former and latter UEs are referred to as high- and low-geometry UEs, respectively. According to the rule of signal reception of NOMA, the receiver of UE#1 should perform codeword level interference cancellation (CW-IC) for the TB intended to UE#2. Specifically, UE#1 decodes the TB intended to UE#2, reconstructs the contribution of the UE#2's signal in the received signal, and then subtracts the reconstructed signal from the received signal to form a clean received signal. UE#1 can therefore decode its own signal via the clean received signal.

As depicted in FIG. 1, plot 110 refers to the resource allocations for UE#1, and plot 120 refers to the resource allocation for UE#2. The two users are scheduled in one common group of resource blocks in a subframe using the NOMA scheme, and another group of resource blocks is scheduled only to UE#2. The former and latter groups of resource blocks are referred to as resource blocks set 1 (RBS1) and resource blocks set 2 (RBS2), respectively. Assume the reception of data carried at RBS1 follows the NOMA signals decoding rule. That is, UE#2 decodes its own signal directly, and UE#1 decodes the signal intended to UE#2 first, performs CW-IC based on the decoding result, and at last decodes its own signal from the cleaner received signal.

According to the specifications of LTE, the data intended to UE#2 delivered in RBS1 and RBS2 correspond to the same TB. Therefore, in order for UE#1 to decode UE #2's signal, it needs to decode the data in both RBS1 and RBS2, even if only RBS1 is scheduled with NOMA. However, UE#1 may not be able to decode the TB intended to UE#2 (at RBS1 plus RBS2). This is because UE#1 and UE#2 are paired as NOMA due to the fact that UE#1 has a higher received signal quality than UE#2 at RBS1; it is not guaranteed UE#1 can decode UE#2's TB at RBS1 plus RBS2, for which the modulation and coding scheme (MCS) is set based on UE#2's effective received signal quality at both RBS1 and RBS2. This issue can be resolved if the scheduler always gives the same resource allocation for UEs #1 and #2 in a subframe. That is, in FIG. 1, when RBS1 is scheduled with the NOMA scheme, UE#2 is not allocated with other resource blocks. Another way of resolution is to impose more scheduling restriction. For example, if UE#2 is to be scheduled in a time-frequency resource (RBS2 in FIG. 1) other than the resource in NOMA (RBS1), then the scheduler should make sure that UE#1 has a higher effective received signal quality than UE#2 over the combined resources of RBS1 plus RBS2. Another potential problem with the scenario shown in FIG. 1 is an extra signaling overhead to UE#1 is required. Consider an LTE common reference signal (CRS) based transmission mode, e.g., transmission modes 3 and 4. For UE #1 to decode the data in RBS2, the network needs to signal the precoder used at RBS2 to UE#1, which increase signaling overhead.

In accordance with one novel aspect, a method is proposed to alleviate the scheduling restrictions mentioned above. For the low-geometry UE#2, one sub-band is used as the basic scheduling unit. As a result, data in RBS scheduled for NOMA operation and data in RBS scheduled for other non-NOMA operation correspond to different TBs. In the example of FIG. 1, for UE#2, data in RBS1 and RBS2 correspond to different TBs. Therefore, UE#1 only needs to decode data in RBS1 scheduled for NOMA. UE#1 no longer needs to decode data in RBS2 scheduled for UE#2 only, and the base station thus does not need to impose additional scheduling restrictions.

Figure 2:
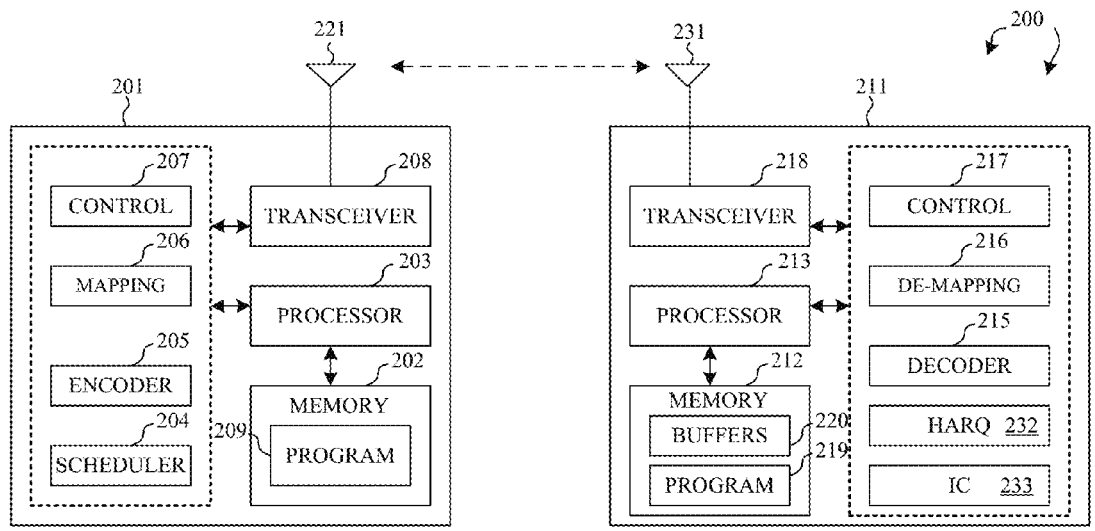
FIG. 2 is a simplified block diagram of a base station and a user equipment that carry out certain embodiments of the present invention.

FIG. 2 is a simplified block diagram of a base station 201 and a user equipment 211 that carry out certain embodiments of the present invention in a mobile communication network 200. For base station 201, antenna 221 transmits and receives radio signals. RF transceiver module 208, coupled with the antenna, receives RF signals from the antenna, converts them to baseband signals and sends them to processor 203. RF transceiver 208 also converts received baseband signals from the processor, converts them to RF signals, and sends out to antenna 221. Processor 203 processes the received baseband signals and invokes different functional modules to perform features in base station 201. Memory 202 stores program instructions and data 209 to control the operations of the base station. Similar configuration exists in UE 211 where antenna 231 transmits and receives RF signals. RF transceiver module 218, coupled with the antenna, receives RF signals from the antenna, converts them to baseband signals and sends them to processor 213. The RF transceiver 218 also converts received baseband signals from the processor, converts them to RF signals, and sends out to antenna 231. Processor 213 processes the received baseband signals and invokes different functional modules to perform features in UE 211. Memory 212 stores program instructions and data 219 to control the operations of the UE. Memory 212 also contains a plurality of soft buffers 220 for storing soft channel bits of encoded code blocks.

Base station 201 and UE 211 also include several functional modules to carry out some embodiments of the present invention. The different functional modules are circuits that can be configured and implemented by software, firmware, hardware, or any combination thereof. The function modules, when executed by the processors 203 and 213 (e.g., via executing program codes 209 and 219), for example, allow base station 201 to schedule (via scheduler 204), encode (via encoder 205), mapping (via mapping circuit 206), and transmit control information and data (via control circuit 207) to UE 211, and allow UE 211 to receive, de-mapping (via de-mapper 216), and decode (via decoder 215) the control information and data (via control circuit 217) accordingly with interference cancellation capability. In one example, base station 201 uses one sub-band as the basic scheduling unit for a low-geometry UE. As a result, data in resource blocks scheduled for NOMA operation and data in resource blocks scheduled for other non-NOMA operation correspond to different transport blocks via scheduler 204. Therefore, a high-geometry UE only needs to decode data in resource blocks scheduled for NOMA. The base station thus does not need to impose additional scheduling restrictions. Under NOMA operation, UE 211 is able to perform Hybrid Automatic Repeat Request (HARQ) via HARQ handler 232, store soft channel bits into partitioned soft buffers for both desired and interfering TBs, and perform codeword level interference cancellation (CW-IC) via IC circuit 233 to decode the superposed code blocks and cancel the contribution of the interfering signals accordingly.

Figure 3:
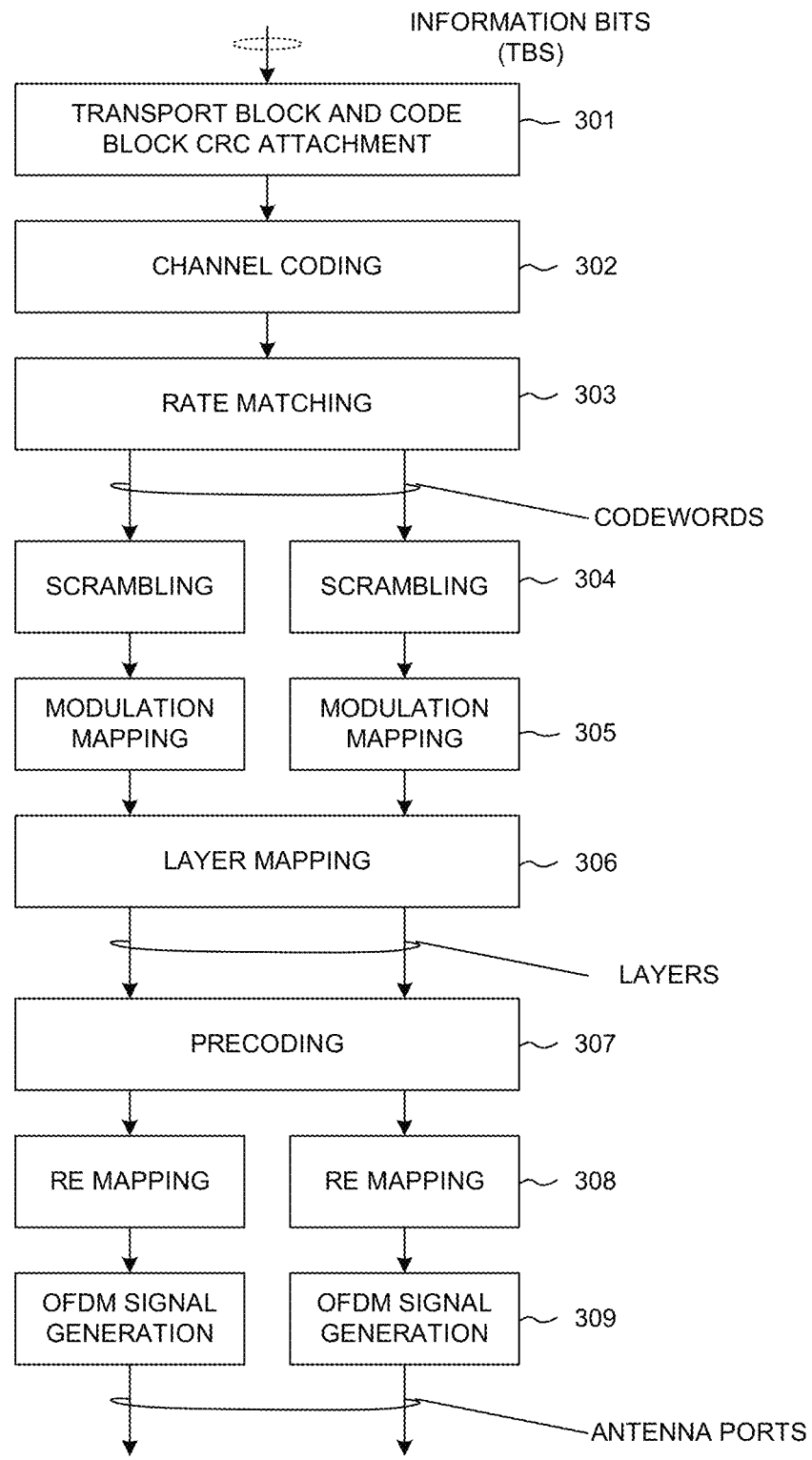
FIG. 3 illustrates functional blocks in a communication system that maps information bits of a transport block to codewords and then maps to baseband signals for transmission.

FIG. 3 illustrates functional blocks of a transmitting device in a communication system that map information bits of a transport block (TB) to codewords and then map to baseband signals for transmission. In step 301, the information bits are arranged into transport blocks (TBs) and attached with CRC. In addition, the TBs are segmented into code blocks and attached with CRC. In step 302, channel coding (forward error correction such as Turbo coding) is performed with certain code rate. In step 303, rate matching is performed, which creates an output with a desired code rate, and where the TBs are mapped into codewords. In step 304, the codewords are scrambled based on predefined scrambling rule (e.g., scramble with a corresponding Radio Network Temporary Identifier (RNTI) of the UE). In step 305, modulation mapping is performed, where the codewords are modulated based on various modulation orders (e.g., PSK, QAM) to create complex-valued modulation symbols. In step 306, layer mapping is performed, where the complex-valued symbols are mapped onto different MIMO layers depending on the number of transmit antenna used. In step 307, precoding is performed with certain precoding matrix index (PMI) for each antenna port. In step 308, the complex-valued symbols for each antenna are mapped onto corresponding resource elements (REs) of physical resource blocks (PRBs). Finally, in step 309, OFDM signals are generated for baseband signal transmission via antenna ports.

Figure 4:
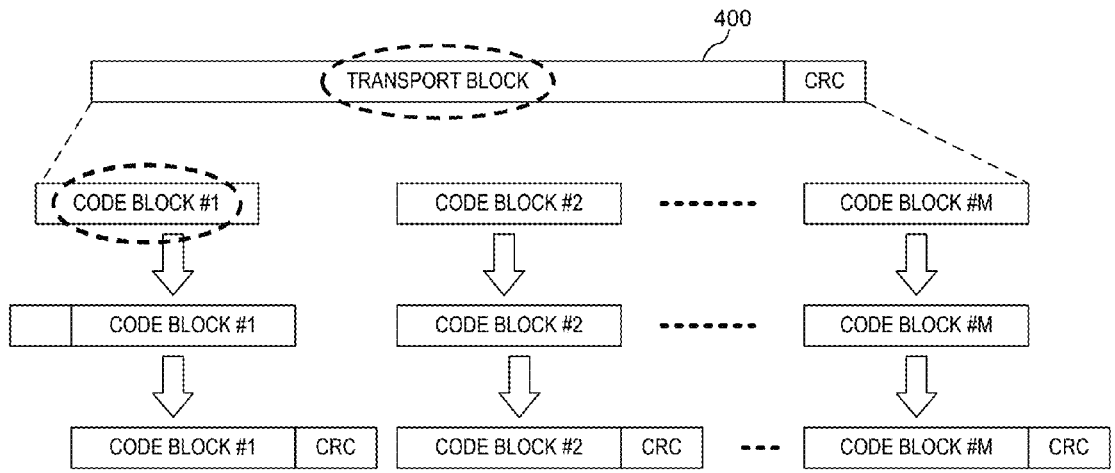
FIG. 4 illustrates how information bits (TBs) of a radio signal is segmented and encoded in LTE systems.

FIG. 4 illustrates how information bits (TBs) of a radio signal is segmented and encoded in LTE systems. A transport block TB 400 with CRC is first segmented into M code blocks. The first code block #1 is then inserted with filler bits. Per-code-block CRC is then calculated and inserted into each code block. Each code block enters channel encoder individually.

Figure 5:
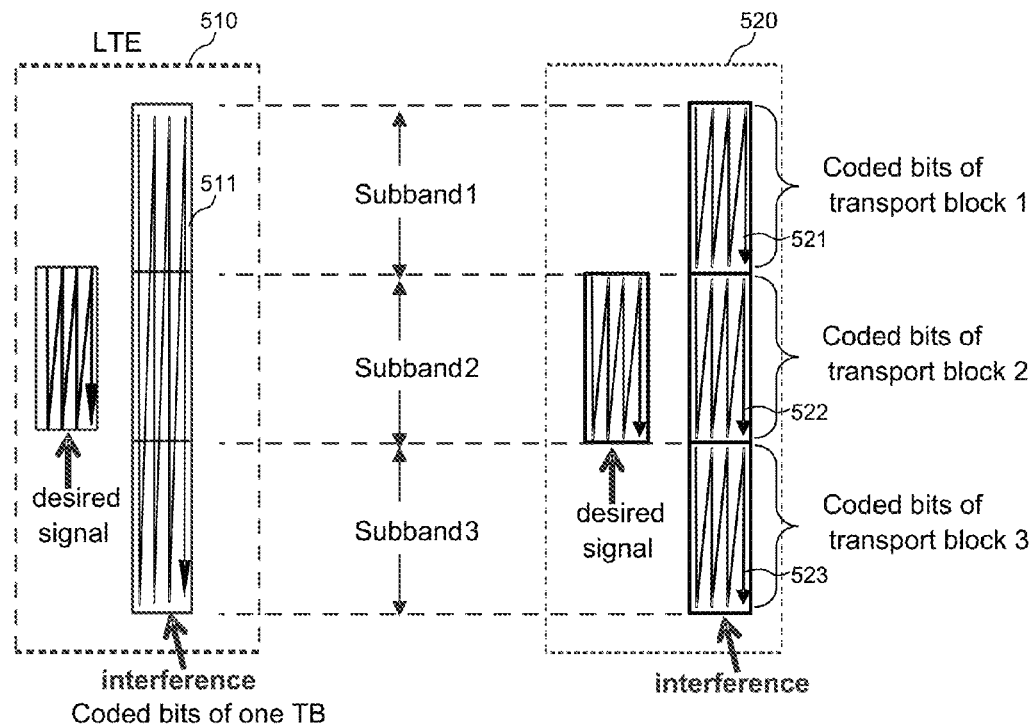
FIG. 5 illustrates the relationship between transport blocks and radio resource blocks for NOMA operation.

FIG. 5 illustrates the relationship between transport blocks and radio resource blocks for NOMA operation. Assume a UE needs to decode a desired signal and an interference signal for NOMA. As depicted by box 510, the desired signal occupies a resource block set that spans across one subband 2, while the interference signal occupies a resource block set that spans across three subbands (subbands 1, 2, and 3). In LTE system, the basic scheduling unit is the resource block set, and the data delivered in the different subbands of the same resource block set corresponds to the same TB. For example, data is encoded along arrow 511 to form the TB. Therefore, for a UE to decode the interference signal, the UE needs to decode the data in all subbands, even if only subband 2 is scheduled for the desired signal.

In accordance with one novel aspect, a base station uses one subband as the basic scheduling unit for each transport block. As depicted by box 520, for the interference signal, the base station generates encoded bits of transport block 1 for subband 1 along arrow 521, encoded bits of transport block 2 for subband 2 along arrow 522, and encoded bits of transport block 3 for subband 3 along arrow 523. As a result, the UE only needs to decode at the interfering transport block 2 at subband 2 for NOMA. In order to do that, the size of transport block 2 needs to be signaled to the UE.

Figure 6:
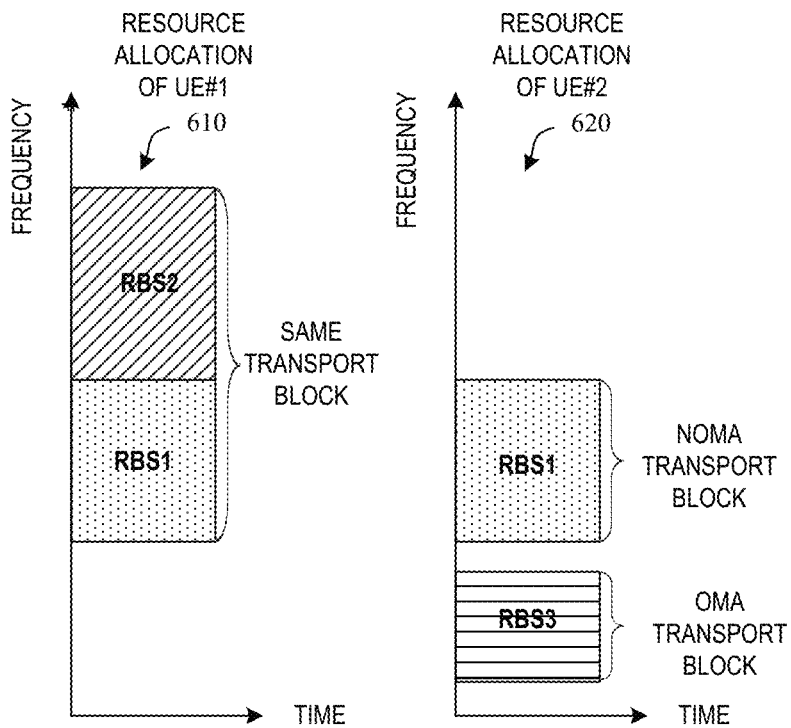
FIG. 6 illustrates a first example of resource allocation for two UEs under NOMA operation in accordance with one novel aspect.

FIG. 6 illustrates a first example of resource allocation for two UEs under NOMA operation in accordance with one novel aspect. Assume superposition-coding scheme is used at the transmitter for the NOMA operation. Given the scenario of NOMA where UE#1 and UE#2 are scheduled in the same time-frequency resource and the transport blocks (TBs) intended to UEs #1 and #2 are superposed and multi-casted to the two users). Suppose that UE#1 is closer to the base station than UE#2. According to the rule of signal reception of NOMA, the receiver of UE#1 should perform codeword level interference cancellation (CW-IC) for the TB intended to UE#2. As depicted by FIG. 6, plot 610 refers to the resource allocations for UE#1, and plot 620 refers to the resource allocation for UE#2. Assume UE#1 and UE#2 are both scheduled at RBS1 with the NOMA scheme. Additionally, UE#1 and UE#2 are separately scheduled at RBS2 and RBS3, respectively, in which the superposition coding scheme is not used. The idea is, for the data intended to UE#2, those delivered in RBS1 and RBS3 belong to two distinct TBs, where the TBs correspond to the former and latter are referred to as "NOMA TB" and "orthogonal multiple access (OMA) TB", respectively. In so doing, in order for UE#1 to perform CW-IC for the signal intended to UE#2 in RBS1, it simply needs to decode the TB delivered in RBS1 instead of decoding the data at RBS1 plus RBS3 as needed in conventional LTE where data in RBS1 and RBS3 must belong to the same TB. The data intended to UE#1 are transmitted over RBS1 and RBS2. Since having these data belong to the same TB does not lead to a restriction in the scheduling decision, data in RBS1 and RBS2 may belong to the same TB.

Figure 7:
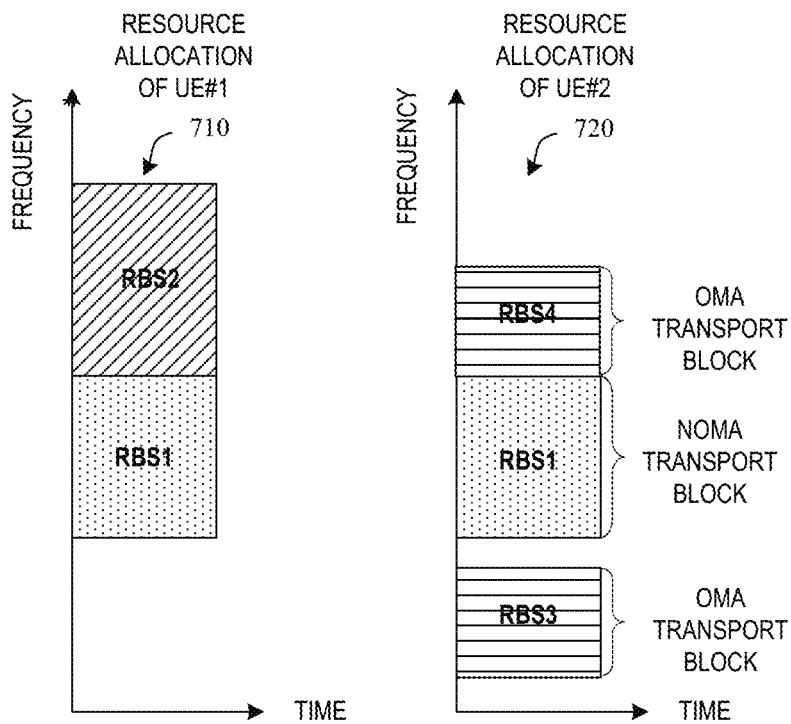
FIG. 7 illustrates a second example of resource allocation for two UEs under NOMA operation in accordance with one novel aspect.

FIG. 7 illustrates a second example of resource allocation for two UEs under NOMA operation in accordance with one novel aspect. Assume superposition-coding scheme is used at the transmitter for the NOMA operation. Given the scenario of NOMA where UE#1 and UE#2 are scheduled in the same time-frequency resource and the transport blocks (TBs) intended to UEs #1 and #2 are superposed and multi-casted to the two users). Suppose that UE#1 is closer to the base station than UE#2. According to the rule of signal reception of NOMA, the receiver of UE#1 should perform codeword level interference cancellation (CW-IC) for the TB intended to UE#2. As depicted by FIG. 7, plot 710 refers to the resource allocations for UE#1, and plot 720 refers to the resource allocation for UE#2. In this example, UE#1 is allocated in RBS1 and RBS2, and UE#2 is allocated in RBS1, RBS3, and RBS4. Based on the proposed method, for UE#2, RBS1 correspond to the NOMA TB, and RBS3 plus RBS4 correspond to one OMA TB. Although three resource blocks sets are allocated, there are only two TBs delivered.

In the proposed method, the data to UE#2 are carried in two TBs. To reduce the signaling overhead in HARQ acknowledgement, HARQ-ACK multiplexing may be used for the reception status (success or failure) on the two TBs. For example, UE#2 performs a logical AND operation between the acknowledgements belonging to the TBs in RBS1 and RBS3. A positive ACK is sent only when both TBs are decoded successfully, and a negative ACK is sent when either of the TBs is decoded unsuccessfully. Furthermore, to avoid the requirement to double the number of HARQ processes when using the proposed method, the two TBs in RBS1 and RBS3 are associated with the same HARQ process rather than two different HARQ processes.

For UE#2, a new resource block allocation in the downlink control information (DCI) is needed to indicate the locations of the two TBs. The network also needs to signal UE#1 two sets of resource blocks—one is associated with the resource blocks to perform CW-IC (e.g., RBS1 in FIG. 6 or FIG. 7), and the other is for the resource blocks of UE#1's signal (e.g., RBS1 and RBS2 in FIG. 6 or FIG. 7).

Figure 8:
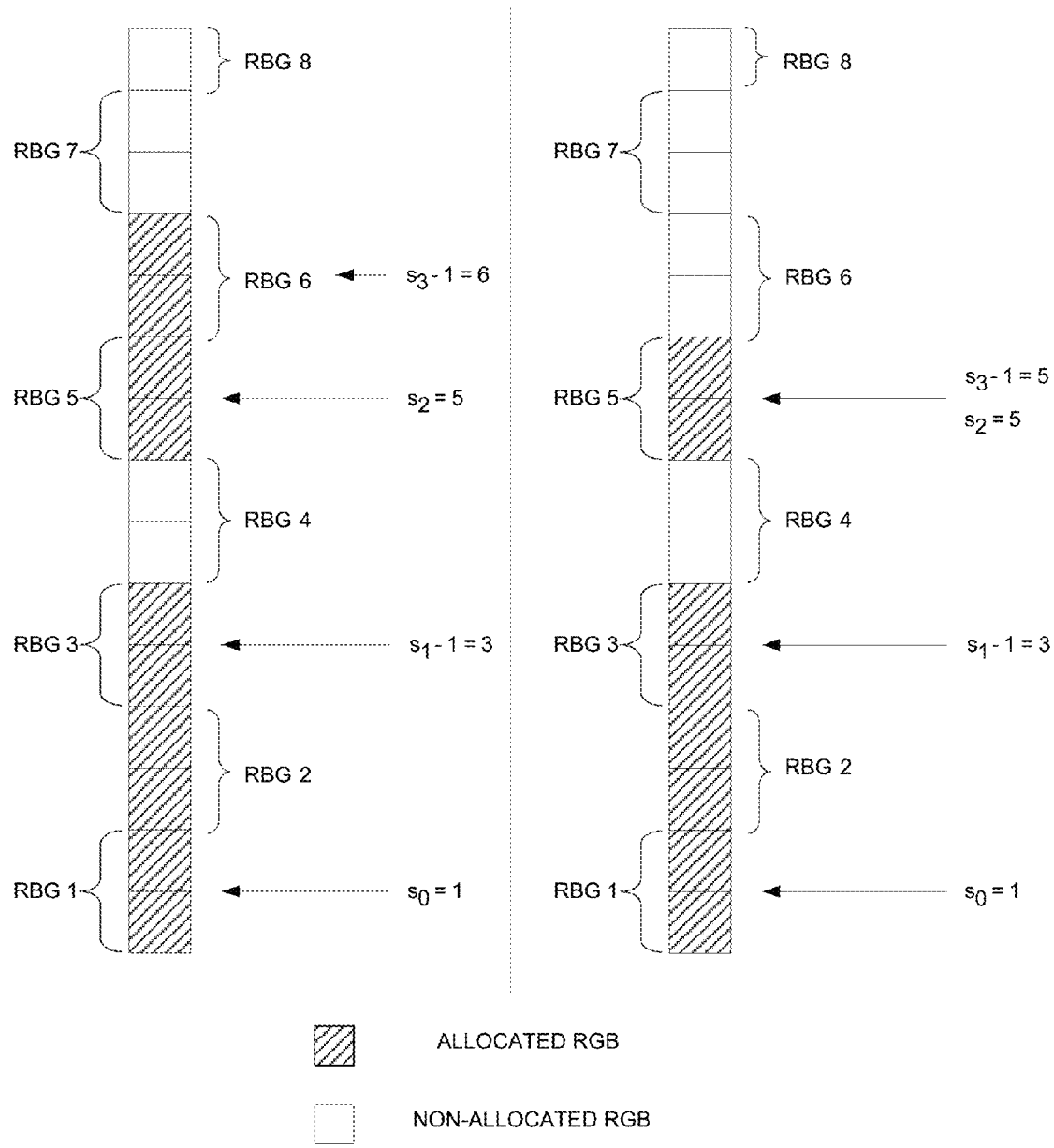
FIG. 8 illustrates examples of resource block allocations with two RBGs and corresponding signaling method in accordance with one novel aspect.

FIG. 8 illustrates examples of resource block allocations with two RBGs and corresponding signaling method in accordance with one novel aspect. The resource block allocation is represented by an integer number r, and a UE is able to understand the resource block allocation by decoding the integer. The resource block allocation defines n sets of resource block groups sets (RBGS), where each set of RBGS includes one or more consecutive resource block groups (RBG). For example, the resource block allocation at the left-hand-side of FIG. 8 indicates two sets of RBGS, where the first and second sets are {RBG1, RBG2, RBG3} and {RBG5, RBG6}, respectively. Define the symbol N as:

$$N = \left\lceil \frac{\text{Number of resource blocks in channel bandwidth}}{RBG \text{ size of the channel bandwidth}} \right\rceil + 1$$

The resource block allocation is defined by 2n indices $\{s_k \in [1,N]: 0 \le k \le 2n-1\}$. Indices $s_0$ and $s_1-1$ defined the first and last RBG within the first RBGS; indices $s_2$ and $s_3-1$ define the first and last RBG within the second RBGS, and so on so forth. The set of 2n indices are combined into a single combinatorial index r before sending to the UE. The value of r is defined as a sum of binomial coefficients using the expression below:

$$r = \sum_{k=0}^{2n-1} \binom{N - s_k}{2n - k}$$

Consider channel bandwidth 3 MHz. The value of N is $\lceil 15/2 \rceil + 1 = 9$. If the resource block allocation is as shown in the left-hand-side of FIG. 8, the value of r is equal to $$r = \binom{9-1}{4} + \binom{9-(3+1)}{3} + \binom{9-5}{2} + \binom{9-(6+1)}{1} = 88$$

The value of r for the resource block allocation at the right-hand-side of FIG. 8 is $$r = \binom{9-1}{4} + \binom{9-(3+1)}{3} + \binom{9-5}{2} + \binom{9-(5+1)}{1} = 89$$

When receiving r with the formula given above, the UE needs to recover $s_k$'s. One of the ways to obtain $s_k$'s one by one in the order of $s_0, \ldots, s_{2n-1}$ is demonstrated below. First, the UE tries the value of t from 1 to N. If $$\binom{N-(t-1)}{2n} > r \text{ and } \binom{N-t}{2n} \le r$$

then $s_0 = t$. Once $s_0$ is determined, the term associated with $s_0$ is subtracted from r, and the UE tries the value of t from 1 to N. If $$\binom{N-t}{2n-1} > r - \binom{N-s_0}{2n} \text{ and } \binom{N-(t+1)}{2n-1} \le r - \binom{N-s_0}{2n}$$

then $s_1 = t+1$. The same procedure is executed until all of $s_k$'s have been found.

Figure 9:
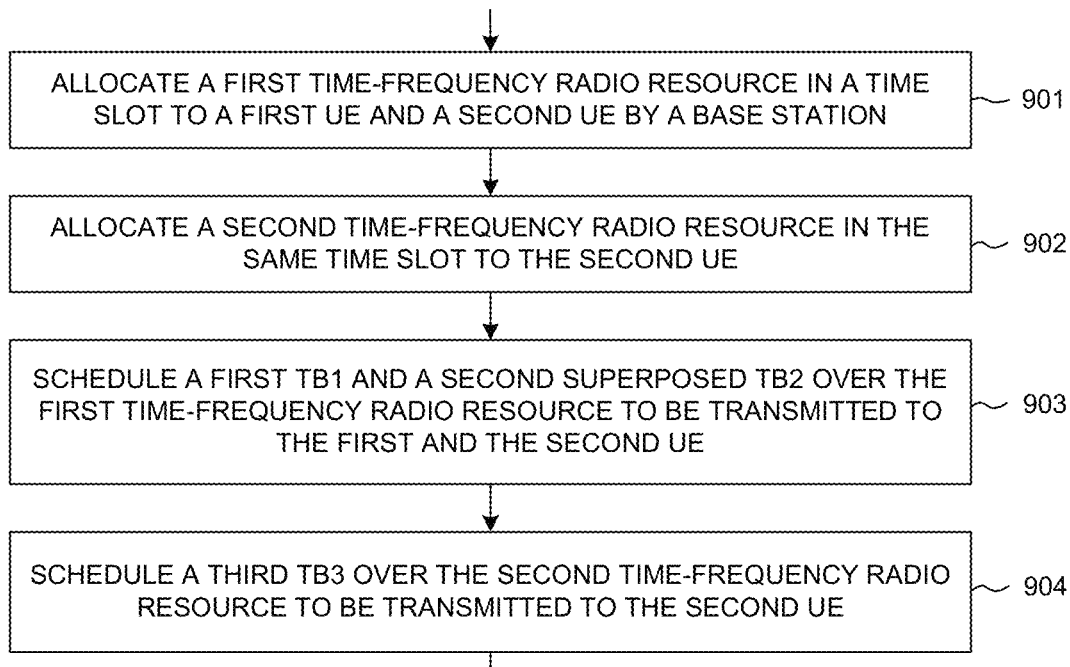
FIG. 9 is a flow chart of a method of resource allocation for superposition coding from eNB perspective in accordance with one novel aspect.

FIG. 9 is a flow chart of a method of resource allocation for superposition coding from eNB perspective in accordance with one novel aspect. In step 901, a base station allocates a first time-frequency radio resource in a time slot to a first UE. In step 902, the base station allocates a second time-frequency radio resource in the same time slot to a second UE. The first and the second time-frequency radio resources have non-overlapping radio resources. In step 903, the base station schedules a first TB1 and a second TB2 over the first time-frequency radio resource to be transmitted to the first and the second UE respectively. In step 904, the base station schedules a third TB over the second time-frequency radio resource to be transmitted to the second UE.

Figure 10:
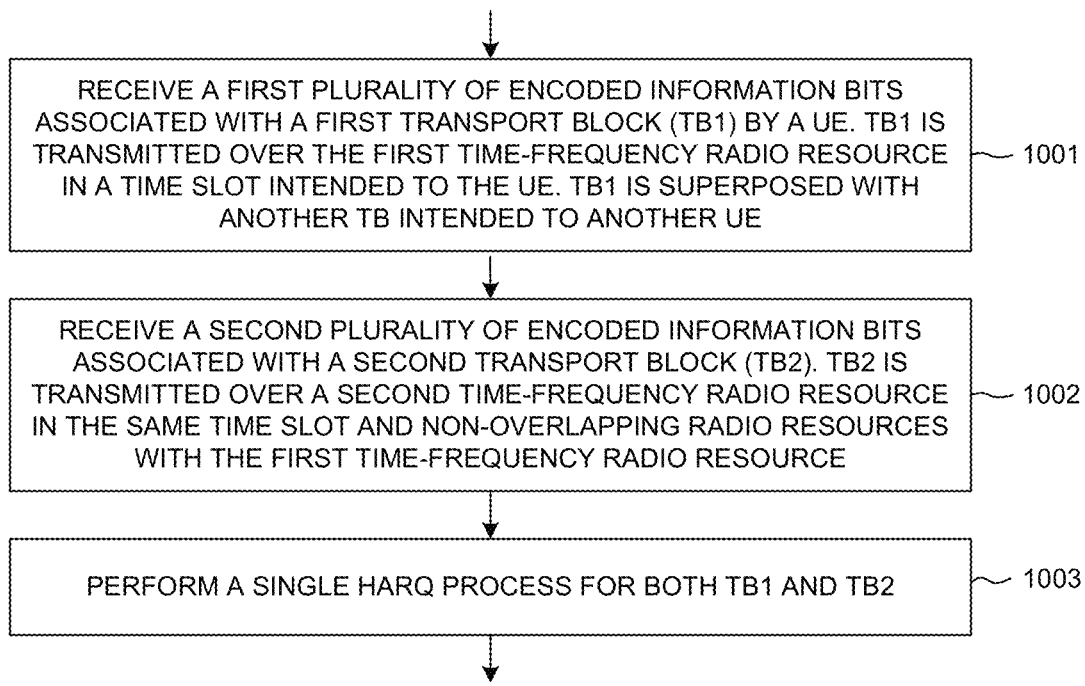
FIG. 10 is a flow chart of a method of resource allocation for superposition coding from UE perspective in accordance with one novel aspect.

FIG. 10 is a flow chart of a method of resource allocation for superposition coding from UE perspective in accordance with one novel aspect. In step 1001, a UE receives a first plurality of encoded information bits associated with a first transport block TB1. TB1 is transmitted over a first time-frequency radio resource in a time slot intended to the UE. TB1 is superposed with another TB intended to another UE. In step 1002, the UE receives a second plurality of encoded information bits associated with a second transport block TB2. TB2 is transmitted over a second time-frequency radio resource in the same time slot and having non-overlapping radio resources with the first time-frequency radio resource. In step 1003, the UE performs a single HARQ process for both TB1 and TB2.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   allocating a first time-frequency radio resource in a time slot to a first user equipment (UE) and a second UE by a base station;
   allocating a second time-frequency radio resource in the same time slot to the second UE, wherein the first and the second time-frequency radio resources are non-overlapping radio resources;
   scheduling a first transport block (TB1) and a second superposed transport block (TB2) over the first time-frequency radio resource to be transmitted to the first and the second UE respectively; and
   scheduling a third transport block (TB3) over the second time-frequency radio resource to be transmitted to the second UE.

2. The method of claim 1, wherein the base station schedules the first UE and the second UE for non-orthogonal multiple access NOMA operation, and wherein the first UE is a high-geometric UE and the second UE is a low-geometric UE respectively.

3. The method of claim 1, wherein the base station schedules the first UE to decode and cancel the superposed second transport block TB2 via codeword level interference cancellation (CW-IC).

4. The method of claim 3, wherein TB3 transmitted over the second time-frequency resource does not need to be decoded by the first UE.

5. The method of claim 1, further comprising:
   allocating a third time-frequency radio resource in the same time slot to the first UE, wherein TB1 is scheduled over both the first and the third time-frequency radio resources to be transmitted to the first UE.

6. The method of claim 1, further comprising:
   allocating a third time-frequency radio resource in the same time slot to the second UE, wherein TB3 is scheduled over both the second and the third time-frequency radio resources to be transmitted to the second UE.

7. The method of claim 1, wherein the first and the second time-frequency radio resources are signaled via an integer number, and wherein a range of the integer number depends on a total number of resource block allocation candidates for transport blocks in the time slot intended to the second UE.

8. A base station, comprising:
   a scheduler that allocates a first time-frequency radio resource in a time slot to a first user equipment (UE) and a second UE, wherein the scheduler also allocates a second time-frequency radio resource in the same time slot to the second UE, and wherein the first and the second time-frequency radio resources are non-overlapping radio resources; and
   a transmitter that transmits a first transport block (TB1) and a second superposed transport block (TB2) over the first time-frequency radio resource to the first and the second UE respectively, wherein the base station also transmits a third transport block (TB3) over the second time-frequency radio resource to the second UE.

9. The base station of claim 8, wherein the base station schedules the first UE and the second UE for non-orthogonal multiple access NOMA operation, and wherein the first UE is a high-geometric UE and the second UE is a low-geometric UE respectively.

10. The base station of claim 8, wherein the base station schedules the first UE to decode and cancel the superposed second transport block TB2 via codeword level interference cancellation (CW-IC).

11. The base station of claim 10, wherein the third transport block TB3 transmitted over the second time-frequency resource does not need to be decoded by the first UE.

12. The base station of claim 8, wherein the BS allocates a third time-frequency radio resource in the same time slot to the first UE, wherein TB1 is scheduled over both the first and the third time-frequency radio resources to be transmitted to the first UE.

13. The base station of claim 8, wherein the BS allocates a third time-frequency radio resource in the same time slot to the second UE, wherein TB3 is scheduled over both the second and the third time-frequency radio resources to be transmitted to the second UE.

14. The base station of claim 8, wherein the first and the second time-frequency radio resources are signaled via an integer number, and wherein a range of the integer number depends on a total number of resource block allocation candidates for transport blocks in the time slot intended to the second UE.

15. A method, comprising:
   receiving a first plurality of encoded information bits associated with a first transport block (TB1) by a user equipment (UE), wherein TB1 is transmitted over a first time-frequency radio resource in a time slot intended to the UE, and wherein TB1 is superposed with another transport block intended to another UE;
   receiving a second plurality of encoded information bits associated with a second transport block (TB2), wherein TB2 is transmitted over a second time-frequency radio resource in the same time slot and having non-overlapping radio resources with the first time-frequency radio resource; and
   performing a single Hybrid Automatic Retransmit (HARQ) process for both TB1 and TB2.

16. The method of claim 15, wherein the UE is scheduled for non-orthogonal multiple access (NOMA) operation, and wherein the UE is a low-geometric UE and wherein the other UE is a high-geometric UE.

17. The method of claim 15, wherein the superposed first transport block TB1 is to be decoded by the other UE via codeword level interference cancellation (CW-IC).

18. The method of claim 15, wherein the UE transmits HARQ acknowledgements of TB1 and TB2 by performing HARQ-ACK multiplexing of TB1 and TB2.

19. The method of claim 15, wherein TB2 is transmitted over the second time-frequency radio resource and a third time-frequency radio resource in the same time slot.

20. The method of claim 15, wherein the UE receives an integer number indicating the first and the second time-frequency radio resources, wherein a range of the integer number depends on a total number of resource block allocation candidates for transport blocks in the time slot intended to the UE.

* * * * *